United States Patent [19]
Yoon

[11] Patent Number: 4,549,793
[45] Date of Patent: Oct. 29, 1985

[54] HEAD-BAND HOLDER FOR EYEGLASSES

[76] Inventor: Jong B. Yoon, 6031 Brook Dr., Falls Church, Va. 22044

[21] Appl. No.: 702,832

[22] Filed: Feb. 19, 1985

[51] Int. Cl.⁴ .............................................. G02C 3/02
[52] U.S. Cl. .................................... 351/156; 351/123
[58] Field of Search ................. 351/41, 122, 123, 133, 351/139, 155, 156, 157; 2/421, 425, 426

[56] References Cited
U.S. PATENT DOCUMENTS 2,609,538  9/1952  Jackson ............................... 351/157
4,152,051  5/1979  Van Tiem et al. ................... 351/123

Primary Examiner—Rodney B. Bovernick
Assistant Examiner—Paul Dzierzynski
Attorney, Agent, or Firm—Walter F. Wessendorf, Jr.

[57] ABSTRACT

Disclosed is a head-band holder having a head band for encircling horizontally the head of the wearer and holder assemblies that are adjustably positionable along the longitudinal axes of the bows. The head band and holder assemblies have cooperating self-engaging VELCRO pads so that the holder assemblies are positionable both laterally and vertically relative to the head band. These described adjustment features of the holder assemblies relative to the bows and relative to the head band provide for adjustable mounting and proper positioning of the eyeglasses on the head of the wearer so that the lenses are properly spaced or located relative to the wearer's eyes, so that the nose bridge does not drag down on the wearer's nose, so that the rims do not push against the perimeters of the wearer's eye sockets and so that the bows are in substantial balance vis-a-vis the rims, lenses and nose bridge.

18 Claims, 5 Drawing Figures

HEAD-BAND HOLDER FOR EYEGLASSES

BACKGROUND OF THE INVENTION

1. Technical Field

This invention relates to a head-band holder for eyeglasses.

2. Background

People who engage in sports such as tennis, jogging, etc. and wear eyeglasses experience problems with eyeglasses, with the eyeglasses slipping because of sweat and with the eyeglasses simply falling off. The problems in the art to which this invention apertains, and which the wearer experiences, are the need for a head-band holder that is adjustably positionable for encircling and snugly engaging the head of the wearer and which has means to adjustably mount and properly position such eyeglasses on the head of the wearer to solve the problem of the lenses being properly spaced or located relative to the wearer's eyes, to solve the problem of the nose bridge dragging down on the wearer's nose, to solve the problem of the nose bridge slipping down because of sweat, to solve the problem of the rims pushing against the perimeters of the wearer's eye sockets and to solve the problem of balancing the bows vis-a-vis the rims, lenses and nose bridge.

Accordingly, the object of the invention is to provide a head-band holder which will contribute to the solutions of the discussed problems of the art.

SUMMARY OF THE INVENTION

In accordance with the invention, there is provided a head-band holder for a pair of eyeglasses comprising a head band and holder assemblies. The head band has elastic portions joining together a front band with left and right rear bands that have cooperating self-engaging VELCRO pads for adjustably joining together the rear bands to allow the head band to encircle the head and be in snug engagement therewith. Corresponding front, left rear and right rear inner sweat bands of suitable padded sweat-absorbing material are fixed to the front band and left and right rear bands to absorb head perspiration of the wearer and which helps with the problem of the nose bridge slipping down because of sweat and the problem of steaming up of the lenses. Left side and right side holder assemblies have loops with slidable rings to define eyes which receive the bows of the eyeglasses. The loops are adjustably positionable along the longitudinal axes of the bows. The head band and holder assemblies have cooperating self-engaging VELCRO pads so that the holder assemblies are positionable both laterally and vertically relative to the head band. The adjustment features of the loops of the holder assemblies along the longitudinal axes of the bows and the positioning of the holder assemblies laterally and vertically relative to the head band provide for adjustable mounting and proper positioning of such eyeglasses on the head of the wearer so that the lenses are properly spaced or located relative to the wearer's eyes, so that the nose bridge does not drag down on the wearer's nose, so that the rims do not push against the perimeters of the wearer's eye sockets and so that the bows are in balance vis-a-vis the rims, lenses and nose bridge.

BRIEF DESCRIPTION OF THE DRAWINGS

This object and other objects of the invention should be discerned and appreciated from the detailed description taken in conjunction with the drawings, wherein like reference numerals refer to similar parts throughout the several views, in which.

DESCRIPTION OF THE PREFERRED EMBODIMENT

Figure 1:
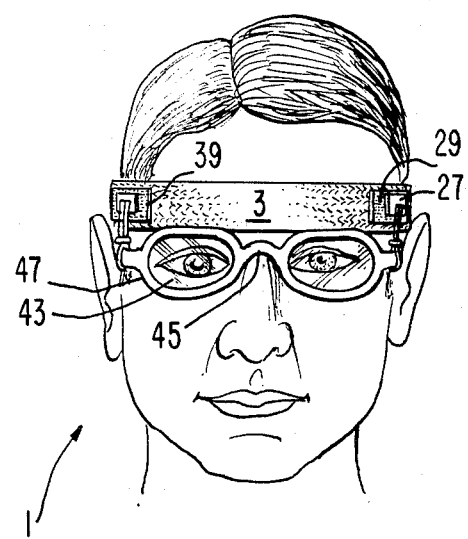
FIG. 1 is a front view showing the head-band holder mounted on the head of the wearer.
Figure 2:
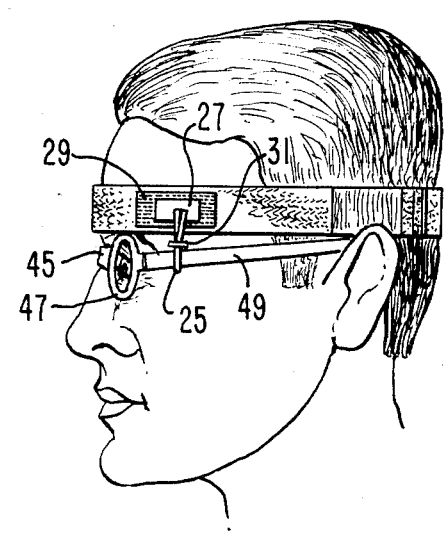
FIG. 2 is a side elevational view showing the head-band holder mounted on the head of the wearer.
Figure 3:
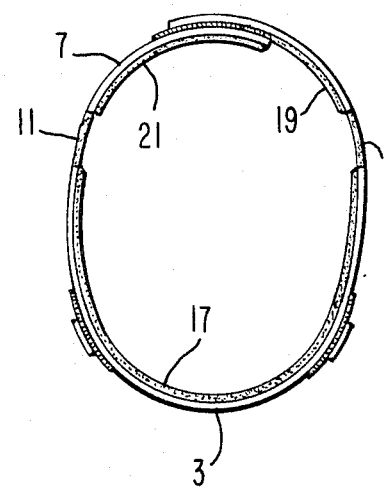
FIG. 3 is top view of the head-band holder.
Figure 4:
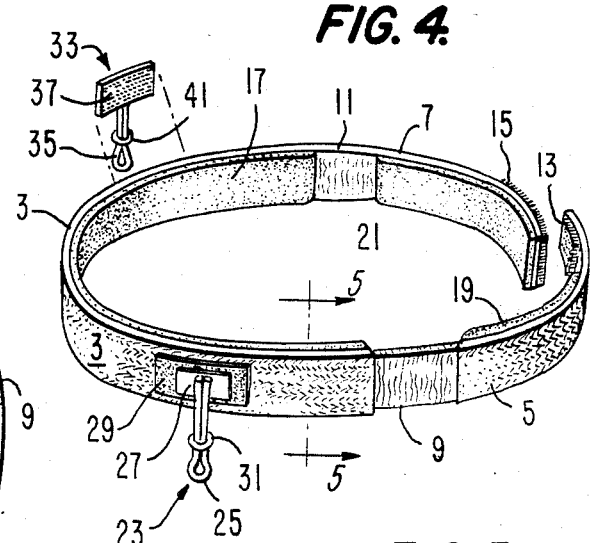
FIG. 4 is a perspective view of the head-band holder.
Figure 5:
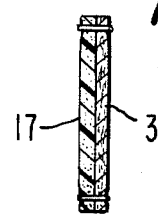
FIG. 5 is a sectional view taken along the line of the arrows 5—5 in FIG. 4.

In FIG. 1 of the drawings, reference numeral 1 generally refers to the invention of the head-band holder for eyeglasses.

Head-band holder 1 conprises a front outer band 3 and left rear and right rear outer bands 5 and 7, made of plastic or other suitable material, which encircle the head of the wearer, as shown.

The left rear and right rear outer bands 5 and 7 are joined to the front outer band 3 by suitable interposed elastic portions 9 and 11, respectively. Cooperating self-engaging VELCRO pads 13 and 15, suitably fixed to left rear and right rear outer bands 5 and 7, allow the head-band holder 1 to encircle the head of the wearer in adjustable mounting relationship for snug engagement therewith.

Front, left rear and right rear inner sweat bands 17, 19 and 21, of suitable padded sweat-absorbing material, are sewn together with or otherwise suitably fixed to front outer band 3 and left rear and right rear outer bands 5 and 7, respectively.

Left side loop holder assembly 23 has a loop 25, of suitable plastic material, sewn together with or otherwise suitably fixed to a cooperating self-engaging VELCRO pad 27 in removable and adjustable relationship both laterally and vertically with a cooperating self-engaging VELCRO pad 29, sewn together with or otherwise suitably fixed to the left side portion of front outer band 3. Ring 31 receives loop 25 and is slidably positionable along loop 25 to open or close the size of the eye thereby formed by loop 25. Ring 31 is in sufficient engagement and interference fit with loop 25 so as to remain where disposed and positioned along loop 25.

Right side loop holder assembly 33 has a loop 35, of suitable plastic material, sewn together with or othewise suitably fixed to a cooperating self-engaging VELCRO pad 37 in removable and adjustable mounting relationship both laterally and vertically with a cooperating self-engaging VELCRO pad 39, sewn together with or othewise suitably fixed to the right side portion of front outer band 3. Ring 41 receives loop 35 and is slidably positionable along loop 35 to open or close the size of the eye thereby formed by loop 35. Ring 41 is in sufficient engagement and interference fit with loop 35 so as to remain where disposed and positioned along loop 35.

The left and right side loop holder assemblies 23 and 33 are utilized to adjustably mount and properly position a conventional pair of eyeglasses on the head of the wearer so that the lenses 43 are properly spaced or located relative to the wearer's eyes, so that the nose bridge 45 does not drag down on the wearer's nose, or push down against the wearer's nose, so that the rims 47 do not push against the perimeters of the wearer's eye sockets, and so that, at the fulcrum points represented by the loops 25 and 35, the bows 49 will be in substantial balance vis-a-vis the lenses 43, nose bridge 45 and rims 47.

To adjustably mount and properly position the conventional pair of eyeglasses, the front outer band 3 and left rear and right rear outer bands 5 and 7 are snugly but comfortably disposed in encircling and symmetrical relationship vis-a-vis the wearer's head by appropriate relative positioning and engagement of the cooperating self-engaging VELCRO pads 13 and 15 with the elastic portions 9 and 11 gently maintaining such snug engagement. Such mounting and positioning will likewise dispose VELCRO pads 29 and 39 in symmetrical relationship vis-a-vis the wearer's head because pads 29 and 39 are already arranged and disposed symmetrically on front outer band 3. Next, by trial and error, the VELCRO pads 27 and 37 are appropriately positioned relative to and engaged with their respective cooperating VELCRO pads 29 and 39. Then, the bows 49 are threaded through the loops 25 and 35 and their respective rings 31 and 41 are appropriately and slidably tightened down on loops 25 and 35 to close their eyes against bows 49. Trial and error movement and positioning of the bows 49 relative to the loops 25 and 35 will result in such desired mounting and proper positioning of the eyeglasses.

It should be appreciated that once the loops 25 and 35 have been adjustably positioned relative to the front outer band 3, the VELCRO pads 13 and 15 can be disengaged to remove head-band holder 1 and reengaged to replace head-band holder 1 on the head of the wearer. This can be accomplished with or without the bows 49 retentively enaged by loops 25 and 35. The front, left rear and right rear inner sweat bands 17, 19 and 21 soak up perspiration from the wearer's head and alleviate the problem of the nose bridge 45 slipping down on the wearer's nose because of sweat and the problem of the lenses steaming up because of sweat. The head-band holder 1 will be especially helpful in sports, such as tennis, where quick jerking movements of the head are necessary and in the past have resulted in the eyeglasses slipping down all over the wearer's face or flying off the wearer's head.

It should be appreciated that the proper spacing or location of the lenses 43 relative to the wearer's eyes afforded by the loop holder assemblies 23 and 33 is substantially that of a parallel relationship. In other words, the movement and positioning of the lenses 43 and rims 47 either toward or away from the wearer's eyes substantially will be parallel movements.

Having thusly described my invention, I claim:

1. A head-band holder for a pair of eyeglasses whose spectacle frame includes rims with lenses, said rims being joined by a nose bridge and said rims being connected in hinged relationship to bows; said head-band holder adjustably mounting and properly positioning such eyeglasses on the head of the wearer so that the lenses are properly spaced or located relative to the wearer's eyes, so that the nose bridge does not drag down on the wearer's nose, so that the rims do not push against the perimeters of the wearer's eye sockets and so that the bows are in substantial balance vis-a-vis the rims, the lenses and the nose bridge; said head-band holder comprising a head band and holder assemblies, said head band being adapted to horizontally encircle the head of the wearer, said holder assemblies having means for releasable retentive engagement and adjustable positioning along the longitudinal axes of the bows of the eyeglasses, said head band and holder assemblies having cooperating fastening means for adjustably positioning said holder assemblies both laterally and vertically relative to said head band, and such adjustable positioning of said holder assemblies relative to said head band together with such adjustable positioning of said holder assemblies along the longitudinal axes of the bows providing such adjustable mounting and proper positioning of such eyeglasses on the head of the wearer.

2. A head-band holder in accordance with claim 1, wherein said head band has cooperating means for adjustably joining together said head band to thusly encircle horizontally the wearer's head and to be in snug engagement therewith.

3. A head-band holder in accordance with claim 2, wherein said cooperating means comprise cooperating self-engaging VELCRO pads.

4. A head-band holder in accordance with claim 1, wherein said means of said holder assemblies for releasable retentive engagement with and adjustable positioning along the longitudinal axes of the bows comprise loops and rings, said rings receiving said loops to define eyes, said eyes receiving said bows, said rings being slidably moved on said loops to narrow the size of said eyes to tighten said eyes by narrowing same on and in engagement with said bows.

5. A head-band holder in accordance with claim 1, wherein said cooperating fastening means for adjustably positioning said holder assemblies both laterally and vertically relative to said head band comprise cooperating self-engaging VELCRO pads.

6. A head-band holder in accordance with claim 1, wherein said head band comprises a front outer band, a left rear outer band, a right rear outer band and elastic portions, wherein said elastic portions are interposed between and join together said front outer band with said left rear outer band and said front outer band with said right rear outer band.

7. A head-band holder in accordance with claim 6, wherein said left rear outer band and said right rear outer band carry cooperating means for adjustably joining together said left rear outer band and said right rear outer band, wherein said front outer band, left rear and right rear outer bands, elastic portions and cooperating means joining together said left rear and right rear outer bands allow said front outer band, said left rear outer band and said right rear outer band to horizontally encircle the wearer's head and to be in snug engagement therewith.

8. A head-band holder in accordance with claim 7, wherein said cooperating means adjustably joining together said left rear outer band and said right rear outer band comprise cooperating self-engaging VELCRO pads.

9. A head-band holder in accordance with claim 5, wherein said cooperating VELCRO pads are symmetrically arranged relative to the wearer's head.

10. A head-band holder in accordance with claim 1, wherein is further provided sweat band means carried by said head band, said sweat band means being of sweat-absorbing material to absorb head perspiration of the wearer to alleviate the problem of the nose bridge slipping down on the wearer's nose because of sweat and to help alleviate the problem of the lenses steaming up.

11. A head-band holder in accordance with claim 1, wherein said head band comprises a front outer band, a left rear outer band, a right rear outer band, elastic portions and cooperating self-engaging VELCRO pads, wherein said elastic portions are interposed between and join together said front outer band and left rear outer band, and said front outer band and right rear outer band, wherein said left rear outer band and said right rear outer band carry said cooperating self-engaging VELCRO pads to join together said left rear outer band with said right rear outer band to thereby horizontally encircle the wearer's head and to be in snug engagement therewith.

12. A head-band holder in accordance with claim 11, wherein said means of said holder assemblies for releasable rententive engagement with and adjustable positioning along the longitudinal axes of the bows comprise loops and rings, said rings receiving said loops to define eyes, said eyes receiving said bows, said rings being slidably moved on said loops to narrow the size of said eyes to tighten said eyes by narrowing same on and in engagement with said bows.

13. A head-band holder in accordance with claim 11, wherein said cooperating fastening means for adjustably positioning said holder assemblies both laterally and vertically relative to said head band comprise cooperating self-engaging VELCRO pads.

14. A head-band holder in accordance with claim 13, wherein said cooperating self-engaging VELCRO pads for adjustably positioning said holder assemblies both laterally and vertically relative to said head band are symmetrically arranged relative to the wearer's head.

15. A head-band holder in accordance with claim 12, wherein said cooperating fastening means for adjustably positioning said holder assemblies both laterally and vertically relative to said head band comprise cooperating self-engaging VELCRO pads.

16. A head-band holder in accordance with claim 15, wherein said cooperating self-engaging VELCRO pads for adjustably positioning said holder assemblies both laterally and vertically relative to said head band are symmetrically arranged relative to the wearer's head.

17. A head-band holder in accordance with claim 6, wherein said outer band, left rear outer band and right rear outer band carry a front inner sweat band, a left rear inner sweat band and a right rear inner sweat band, respectively, wherein said sweat bands of sweat-absorbing material to absorb the head perspiration of the wearer to alleviate the problem of the nose bridge slipping down on the wearer's nose and to help alleviate the problem of the lenses steaming up.

18. A head-band holder in accordance with claim 11, wherein said outer band, left rear outer band and right rear outer band carry a front inner sweat band, a left rear inner sweat band and a right rear inner sweat band, respectively, wherein said sweat bands are of sweat-absorbing material to absorb the head perspiration of the wearer to alleviate the problem of the nose bridge slipping down on the wearer's nose because of sweat and to help alleviate the problem of the lenses steaming up.

* * * * *